(12) United States Patent
VanBlon et al.

(10) Patent No.: US 10,571,919 B2
(45) Date of Patent: Feb. 25, 2020

(54) SYSTEMS AND METHODS TO IDENTIFY DIRECTIONS BASED ON USE OF AUTONOMOUS VEHICLE FUNCTION

(71) Applicant: Lenovo (Singapore) Pte. Ltd., New Tech Park (SG)

(72) Inventors: Russell Speight VanBlon, Raleigh, NC (US); Ryan Charles Knudson, Durham, NC (US); Timothy Winthrop Kingsbury, Cary, NC (US); Roderick Echols, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 260 days.

(21) Appl. No.: 15/660,023

(22) Filed: Jul. 26, 2017

(65) Prior Publication Data

US 2019/0033870 A1 Jan. 31, 2019

(51) Int. Cl.
*G01C 22/00* (2006.01)
*G05D 1/00* (2006.01)
(Continued)

(52) U.S. Cl.
CPC .......... *G05D 1/0212* (2013.01); *B60K 35/00* (2013.01); *G01C 21/34* (2013.01); *G01C 21/3407* (2013.01); *G01C 21/3461* (2013.01); *G05D 1/0022* (2013.01); *G05D 1/0061* (2013.01); *B60K 2370/16* (2019.05); *B60K 2370/166* (2019.05); *B60K 2370/175* (2019.05)

(58) Field of Classification Search
CPC .... B60K 2370/16; B60K 35/00; G01C 21/34; G01C 21/3407; G01C 21/3461; G05D 1/0022; G05D 1/0061; G05D 1/0212
See application file for complete search history.

(56) References Cited

U.S. PATENT DOCUMENTS 9,188,985 B1 11/2015 Hobbs et al.
9,970,615 B1 * 5/2018 Cardillo .................. G06F 3/00
(Continued)

FOREIGN PATENT DOCUMENTS

WO 2018026603 A1 2/2018

OTHER PUBLICATIONS

Nathan J. Peterson, Russell Speight VanBlon, John Carl Mese, "Systems and Methods for Identifying First Route to Destination as Involving Less Human Driving of Vehicle than Second Route to Destination", file history of related application U.S. Appl. No. 15/894,584, filed Feb. 12, 2018.
(Continued)

*Primary Examiner* — Harry Y Oh
(74) *Attorney, Agent, or Firm* — John M. Rogitz; John L. Rogitz

(57) ABSTRACT

In one aspect, a device includes a processor and storage accessible to the processor. The storage bears instructions executable by the processor to receive input indicating a destination and to determine whether at least a portion of a route to the destination will be driven using an autonomous vehicle function. The instructions are also executable to determine directions to the destination based on the determination of whether at least a portion of a route to the destination will be driven using an autonomous vehicle function, and to output the directions.

20 Claims, 6 Drawing Sheets

(51) Int. Cl.
  *G05D 1/02* (2020.01)
  *G01C 21/34* (2006.01)
  *B60K 35/00* (2006.01)

(56) References Cited

U.S. PATENT DOCUMENTS

| | | | |
|---|---|---|---|
| 10,309,789 B2* | 6/2019 | Ramasamy | G08G 1/096758 |
| 2011/0143726 A1* | 6/2011 | de Silva | G01C 21/3688 |
| | | | 455/414.1 |
| 2014/0026065 A1* | 1/2014 | Wang | G06Q 50/30 |
| | | | 715/744 |
| 2014/0309864 A1* | 10/2014 | Ricci | H04W 4/21 |
| | | | 701/36 |
| 2016/0280236 A1* | 9/2016 | Otsuka | B60W 10/20 |
| 2017/0219364 A1 | 8/2017 | Lathrop et al. | |
| 2017/0259832 A1 | 9/2017 | Lathrop et al. | |
| 2017/0301235 A1* | 10/2017 | Endo | B60W 40/09 |
| 2017/0314957 A1 | 11/2017 | Mimura et al. | |
| 2017/0370740 A1 | 12/2017 | Nagy et al. | |
| 2018/0100742 A1* | 4/2018 | Greenwood | G01C 21/30 |
| 2018/0113460 A1 | 4/2018 | Koda et al. | |
| 2018/0162387 A1* | 6/2018 | Sung | G08G 1/165 |
| 2018/0237012 A1* | 8/2018 | Jammoussi | G08G 1/0962 |
| 2018/0252541 A1* | 9/2018 | Kesting | G01C 21/3461 |
| 2018/0259956 A1* | 9/2018 | Kawamoto | B60W 40/09 |

OTHER PUBLICATIONS

Peterson et al., "Systems and Methods for Identifying First Route to Destination as Involving Less Human Driving of Vehicle than Second Route to Destination", related U.S. Appl. No. 15/894,584, Non-Final Office Action dated Jul. 8, 2019.

* cited by examiner

ROUTE A-MANUAL DRIVING SELECTED — 602

THIS ROUTE WILL TAKE 90 MINUTES BECAUSE YOU CAN'T TAKE THE AUTOPILOT LANE OF I440. — 604

606

ALTERNATE ROUTE: — 608

610

ROUTE B  AUTOPILOT WILL BE USED FOR I440, BUT YOU WILL STILL HAVE TO DRIVE YOURSELF THROUGH DOWNTOWN RALEIGH. (85 MINUTES) — 612

614

MANUAL DRIVING — 702

TURN RIGHT AHEAD — 704

706

USE AUTOPILOT ROUTE — 708

SYSTEMS AND METHODS TO IDENTIFY DIRECTIONS BASED ON USE OF AUTONOMOUS VEHICLE FUNCTION

BACKGROUND

Self-driving vehicles are emerging in today's technology marketplace. However, as recognized herein, there may be instances where driving a vehicle manually may be more optimal for a given set of circumstances or for reaching a destination as fast as possible. As also recognized herein, there may be other instances where self-driving may be more optimal for a given set of circumstances or for reaching a destination as fast as possible. However, current GPS devices for providing directions to a destination do not account for whether the vehicle is in a self-driving mode or is being manually driven by a user. There are currently no adequate solutions to the foregoing computer-related, technological problem.

SUMMARY

Accordingly, in one aspect a device includes a processor and storage accessible to the processor. The storage bears instructions executable by the processor to receive input indicating a destination and to determine whether at least a portion of a route to the destination will be driven using an autonomous vehicle function. The instructions are also executable to determine directions to the destination based on the determination of whether at least a portion of a route to the destination will be driven using an autonomous vehicle function, and to output the directions.

In another aspect, a method includes determining whether an autopilot feature will be used for at least a portion of driving by a vehicle to a destination. The method also includes identifying a first route to the destination based on determining that the autopilot feature will be used for at least a portion of driving to the destination and identifying a second route to the destination based on determining that the autopilot feature will not be used for at least a portion of driving to the destination. The method also includes outputting directions for following at least one of the first route and the second route.

In still another aspect, a computer readable storage medium that is not a transitory signal includes instructions executable by at least one processor to receive input indicating a destination, identify first directions to the destination based on a vehicle being self-driven, and identify second directions to the destination based on the vehicle being driven by a person. The instructions are also executable by the at least one processor to output at least one of the first directions and the second directions.

The details of present principles, both as to their structure and operation, can best be understood in reference to the accompanying drawings, in which like reference numerals refer to like parts, and in which:

DETAILED DESCRIPTION

Figure 1:
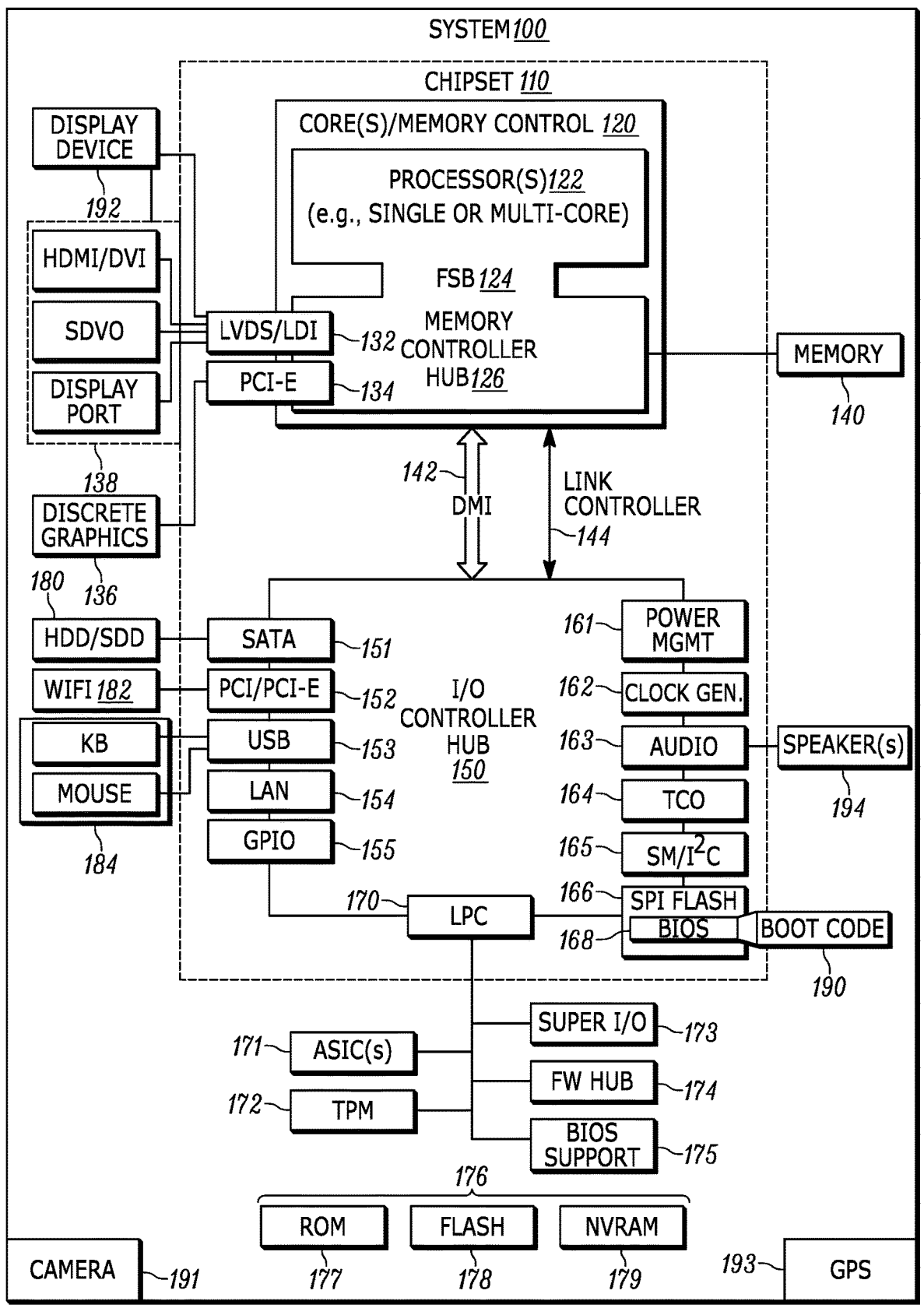
FIG. 1 is a block diagram of an example system in accordance with present principles.

Disclosed herein are systems and methods for determining and changing driving routes depending on if a vehicle is being is self-driven or manually driven by a user. If manually driven, the alternate route for vehicle self-driving may be displayed on a GPS route guidance device such as the user's smart phone. Self-driving may be used to avoid areas of high traffic congestion, areas that have higher human-fault traffic accidents as opposed to self-driving-fault accidents, areas with high number of pedestrians, etc.

Further, the present application recognizes that a self-driving route may not always be a faster or safer route. For instance, self-driving vehicles are sometimes slower at driving through areas with large numbers of pedestrians than when the vehicle is manually driven by a human because, when in the self-driving mode, the vehicle takes less risk where it may not be as sure or accurate as a human at detecting pedestrians that seemingly come out of nowhere. Thus, a device determining directions for a vehicle to drive on autopilot may select a route that avoids an area associated with pedestrians.

The present application also recognizes that self-driving vehicles may be given exclusive access to certain roads or lanes so long as the vehicle is actually being driven on autopilot rather than being manually driven by a user. When such a lane or road is available for self-driving, the self-driving vehicle may be routed onto that road or lane whereas for manual driving the driver would be routed elsewhere. Data describing self-driving-only roads and lanes may be stored in an online mapping system or database so that a device may access the system or database to make route determinations based on whether the vehicle will be driven manually by a user or by the vehicle's autopilot.

Roads and lanes may be dedicated to only autopilot driving in the first place so that, for example, these roads and lanes may permit vehicles to move efficiently in a manner that would otherwise be too aggressive for manual driving. This may be the case owing to the self-driving vehicles being able to more precisely calculate and time fast-paced turns at busy intersections, fast-paced lane changes, slow downs of other vehicles in front of the current vehicle, etc.

If directions are being output by an end-user's personal device, such as the user's smart phone, a vehicle with self-driving functionality may wirelessly communicate with the smart phone to indicate whether the vehicle is in a self-driving mode or manual driving mode. For older manual-only vehicles, the lack of such communication from the vehicle may indicate to the smart phone's maps application or GPS application that the vehicle is or will be manually driven.

A parental control feature may also be used in accordance with present principles. For example, when a teenager that is just learning how to drive wishes to go somewhere, a parent may restrict the teenager from being able to enter certain geographic areas, roads, high-speed interstate freeways, or other scenarios unless the vehicle is being self-driven rather than driven by the teenager. A device using such a parental control feature may even communicate over the Internet to check traffic conditions in real time and identify congested interstate freeways, change the route being taken to the teenager's destination, and instead route the teenager onto other roads that are not congested. But, in some examples, if traffic is light on the interstate freeway, then manual driving may be allowed on the interstate freeway when it otherwise might not be allowed. Also, the parental controls may be modified or overridden in some examples if a driving instructor or adult is in the vehicle with then teenager.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more cameras 191 that gather one or more images and provide them to the processor 122. The cameras 191 may be thermal imaging cameras, digital cameras such as webcams, three-dimensional (3D) cameras, and/or cameras otherwise integrated into the system 100 and controllable by the processor 122 to gather pictures/images and/or video. The system 100 may also include a GPS transceiver 193 that is configured to receive geographic position information from at least one satellite and provide the information to the processor 122 in accordance with present principles. However, it is to be understood that another suitable position receiver other than a GPS receiver may be used in accordance with present principles to determine the location of the system 100.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. The system 100 may also include an audio receiver/microphone that provides input from the microphone to the processor 122 based on audio that is detected, such as via a user providing audible input to the microphone.

It is to be understood that an example client device or other machine/computer may include fewer or more features than shown on the system 100 of FIG. 1. In any case, it is to be understood at least based on the foregoing that the system 100 is configured to undertake present principles.

Figure 2:
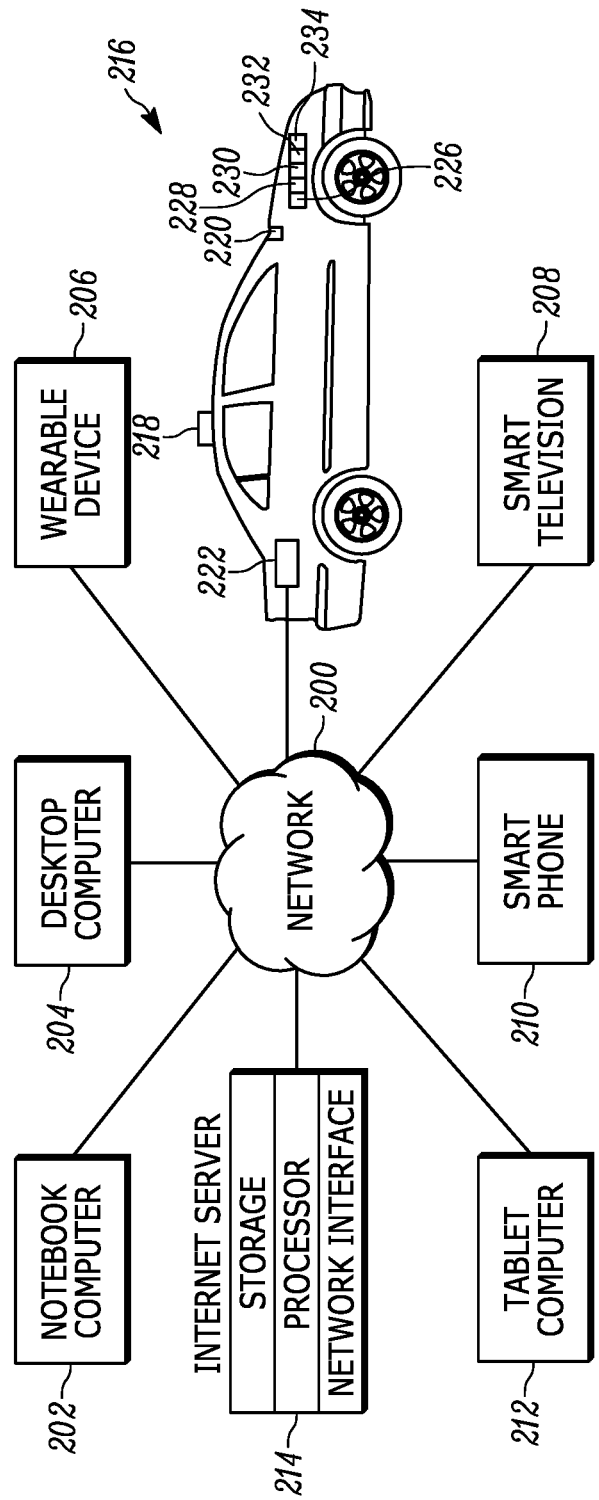
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a smart vehicle 216, and a server 214 such as an Internet server that may provide cloud storage accessible to the devices 202-212, 216. It is to be understood that the devices 202-216 are configured to communicate with each other over the network 200 to undertake present principles.

Describing the vehicle 216 in more detail, it may include a laser rangefinder/lidar unit 218 as well as a display 220. The display 220 and unit 218 may communicate with an on-board computing system 222 to perform vehicle self-driving in accordance with present principles. The system 222 may be similar to the system 100 described above.

Sensors 226-234 may also communicate with the on-board computing system 222 to perform vehicle self-driving in accordance with present principles. The sensor 226 may be a motion sensor such as a gyroscope, accelerometer and/or altimeter. Additionally, the sensor 228 may be a radar unit, the sensor 230 may be a sonar/ultrasound unit, the sensor 232 may be a camera, and the sensor 234 may be a GPS transceiver. The sensors 226-234 are shown as generally being disposed on a front portion of the vehicle 216 for simplicity, but each type of sensor may be placed at multiple different locations on the vehicle 216 for performance of self-driving. So, for example, there may be radar units, sonar units, and cameras respectively disposed at multiple different locations around the vehicle 216 for the system 222 to perform vehicle self-driving/autonomous driving in accordance with present principles.

Figure 3:
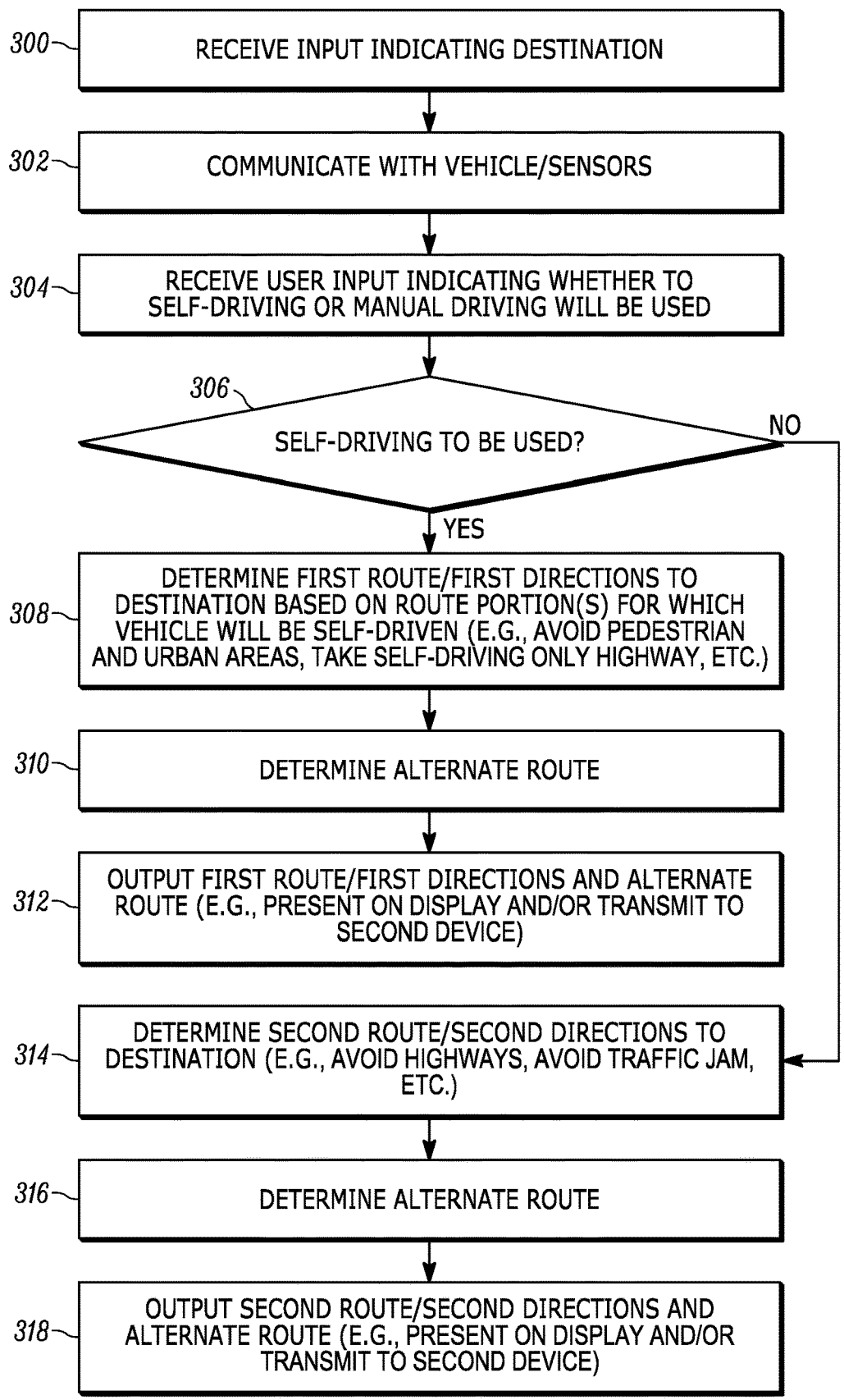
FIG. 3 is a flow chart of an example algorithm in accordance with present principles.

Referring now to FIG. 3, it shows example logic that may be executed by a device such as the system 100, an end-user's device, a server, or an on-board computing system of a vehicle. The logic may be executed to determine alternate routes for directions to a destination based on whether autonomous driving or manual user driving will be performed in accordance with present principles. Beginning at block 300, the device may receive input indicating a destination. If the logic of FIG. 3 is being executed by a server for determining directions to then provide to a vehicle or user's smart phone, at block 300 the server may receive the input based on a wireless transmission from the vehicle or smart phone indicating the destination as input by the user at the vehicle or smart phone. If the logic of FIG. 3 is being executed by the smart phone or vehicle itself, at block 300 the device may receive the input based on the user providing touch input to a keyboard or other user interface to indicate the destination. The destination itself may be indicated in GPS coordinates and/or as a street address.

From block 300 the logic of FIG. 3 may continue to block 302. At block 302 the device may communicate with one or more sensors or other devices. If the logic of FIG. 3 is being executed by a server, at block 302 the server may receive a communication from the vehicle or smart phone indicating that a self-driving/autonomous vehicle function is or will be used, or indicating that the self-driving/autonomous vehicle function will not be used. The communication itself may have been generated based on the user indicating to the smart phone or vehicle that the user wishes to use the self-driving/autonomous vehicle function, and/or based on the vehicle itself actually being put into autonomous vehicle mode or manual driving mode.

If the logic of FIG. 3 is being executed by the vehicle or smart phone, at block 302 input may be received at one of those devices indicating that a self-driving/autonomous vehicle function is or will be used, or indicating that the self-driving/autonomous vehicle function will not be used. The input may be established based on the vehicle being put into the autonomous vehicle mode or the manual driving mode, and/or based on user input to use one of the modes. The input may then be transmitted to whichever of the smart phone or vehicle is to identify directions to the destination.

Furthermore, if the logic of FIG. 3 is being executed by the vehicle itself, at block 302 the vehicle may receive input from one or more sensors in the vehicle, such as a camera or weight sensors in the vehicle's seats, to identify a particular person in the vehicle and/or a number of people in the vehicle. If a camera is used, object recognition software may be used to identify the number of people or the particular person. If weight sensors are used, each sensor disposed in a respective seat may be used to identify the number of people in the vehicle based on the number of sensors in respective seats that sense/indicate weight.

From block 302 the logic of FIG. 3 may then proceed to block 304. At block 304 the device may, if it has not already done so, receive user input indicating whether autonomous driving or manual driving should be used. The user input may be generated, for example, based on touch input to a user interface (UI) presenting options for selecting autonomous driving or manual driving, as presented on a display of the vehicle or the user's smart phone.

From block 304 the logic may then proceed to decision diamond 306. At diamond 306 the device may determine whether autonomous driving/self-driving will be used. The determination may be made based on the communications and input, respectively, from blocks 302 and 304. For example, if the logic of FIG. 3 is being executed by a server, the device may make an affirmative determination at diamond 306 based on the vehicle communicating that it is in the autonomous driving mode or based on a smart phone indicating that autonomous driving should be used as indicated by a user using the smart phone. Conversely, a negative determination may be made based on the vehicle communicating that it is in the manual driving mode or based on the smart phone indicating that manual driving should be used.

An affirmative determination may also be made at diamond 306 if the logic of FIG. 3 is being executed by a vehicle or smart phone and the vehicle indicated that it has been placed in the autonomous driving mode or user input was received that indicated that autonomous driving should be used. Conversely, a negative determination may be made at diamond 306 if the vehicle indicated that it has been placed in the manual driving mode or user input was received that indicated that manual driving should be used.

Additionally, in some embodiments a negative determination may be made at diamond 306 if the vehicle indicates that it is not capable of autonomous driving or if it is otherwise determined that the vehicle is not capable of autonomous driving. For example, if the vehicle does not have sensors such as the sensors 226-234 discussed above, then a negative determination may be made based on the vehicle indicating that it is not capable of autonomous driving. Additionally, if the logic is being executed by the server or user's smart phone and communication with the vehicle is attempted but cannot be established, the logic may make a negative determination at diamond 306 such as may be the case for a vehicle that cannot perform autonomous driving and indeed may not have an on-board computing system at all.

Still in reference to diamond 306, if input from the sensor(s) received at block 302 indicated the presence of two or more people in the vehicle or indicated the presence of a particular person (such as a child of the user), an affirmative determination made be made, whereas a negative determination may be made if only one person is in the vehicle. The presence of two or more people, or of a particular person, may be used in embodiments where parental controls are to be employed, as will be described further below in reference to other figures.

A negative determination at diamond 306 may cause the logic to proceed to block 314, which will be discussed shortly. However, first note that an affirmative determination at diamond 306 may instead cause the logic to move to block 308. At block 308 the vehicle, smart phone, or server may access a map or directions database to determine first directions and/or a first route to the destination based on at least some portions of the directions/route being driven using the vehicle's autonomous vehicle mode. For example, urban areas having or otherwise associated with high pedestrian traffic may be avoided using the first directions/route. As another example, the directions/route may include the vehicle travelling in a particular lane of a road or highway reserved for autonomous driving, or traveling on a particular road or highway that is reserved entirely for autonomous driving. The lane, road, or highway may be determined from a database that indicates the location of respective lanes, roads, and highways reserved for autonomous driving. In this way, an autonomous vehicle that may not drive through high-pedestrian areas as fast as a user may avoid those areas while still traversing a highway or lane reserved for autonomous driving that may be relatively faster for reaching the destination than had another highway or lane been used that is not reserved for autonomous driving.

Additionally, note that in some examples at block 308 more than one route/directions for autonomous driving may be determined. For instance, a first route may be identified for using autonomous driving for a first portion of the route and using manual driving for a second portion of the respective route, and a second route may be identified that uses autonomous driving for all of the respective route. This may be useful where, for example, a combination of autonomous and manual driving may help a user reach his/her destination as fast as possible but where driving the entire route autonomously is also available. Hence, the device may provide the user with a choice between part manual driving and part autonomous driving to arrive as fast as possible, or using autonomous driving for the entire route so that the user need not perform manual driving.

From block 308 the logic may then proceed to block 310. At block 310 the device may determine one or more alternate directions/routes to the destination, such as a route for which autonomous driving will not be used. After block 310 the logic may then proceed to block 312 where the device may output the first route/directions and also output the alternate route(s)/direction(s). If the logic is being executed by a server, the first route/directions and the alternate route(s)/direction(s) may be output by transmitting them to the vehicle or smart phone. If the logic is being executed by the vehicle or smart phone, the first route/directions and the alternate route(s)/direction(s) may be output by presenting them using that device's display after the directions/routes are determined by that device or received from the server.

Now referring back to decision diamond 306, if a negative determination is made at this step then the logic may proceed to block 314. At block 314 the vehicle, smart phone, or server may access a map or directions database to determine second directions and/or a second route to the destination based on the directions/route being driven manually by a user by controlling the vehicle's steering wheel, gas pedal, and brake pedal (rather than the vehicle driving itself autonomously). For example, highways may be avoided via the second directions/route. As another example, the directions/route may include the vehicle avoiding an adverse traffic condition such as a traffic jam caused by an accident or such as a slowdown from normal traffic speed. Also, a particular lane, road or highway reserved for autonomous driving may be avoided using the second route/directions.

From block 314 the logic may then proceed to block 316. At block 316 the device may determine one or more alternate directions/routes to the destination, such as a route for which autonomous driving will be used for all or part of the route. After block 316 the logic may then proceed to block 318 where the device may output the second route/directions and also output the alternate route(s)/direction(s). If the logic is being executed by a server, the second route/directions and the alternate route(s)/direction(s) may be output by transmitting them to the vehicle or smart phone. If the logic is being executed by the vehicle or smart phone, the second route/directions and the alternate route(s)/direction(s) may be output by presenting them using that device's display after the directions/routes are determined by that device or received from the server.

Figure 4:
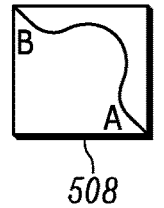
FIGS. 4-9 are example user interfaces (UIs) in accordance with present principles.

Referring now to FIG. 4, it shows an example user interface (UI) 400 that may be presented on the display of a device such as a vehicle or smart phone. The UI 400 may be for a user to input a destination to which the user would like to travel, and accordingly the input may be directed to input box 402 using a hard keyboard or a soft keyboard presented on a touch-enabled display. The UI 400 may also include an option 404 that is selectable by the user (e.g., based on touch input or using a mouse) to indicate that manual driving will be used and/or to place the vehicle in a manual driving mode. The UI 400 may also include an option 406 that is selectable to indicate that self-driving/autonomous driving will be used and/or to place the vehicle in an autonomous driving mode. Still further, the UI 400 may include an option 408 that is selectable to indicate that the user is open to using both manual driving and self-driving and/or to indicate that the autonomous and manual modes should be switched between when appropriate.

Figure 5:
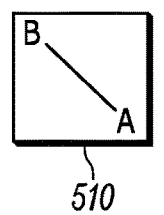

Continuing the detailed description in reference to FIG. 5, it shows another example UI 500 in accordance with present principles. The UI 500 may indicate respective directions/routes 502, 504, and 506 that have been identified based on whether vehicle autonomous driving/self-driving will be used or whether user manual driving will be used. The text for each route 502, 504, and 506 may be selected based on touch input or using a mouse to select that respective option, and/or the alphabetical icons themselves (e.g., (A), (B) or (C)) may be selected to select that respective route/set of directions.

As shown in FIG. 5, the text for option 502 indicates that the option 502 pertains to a route option for using vehicle self-driving for the entire route. The text for this option also indicates that the route avoids an urban area and indicates the estimated time the respective route will take to travel to reach the user's destination. Still further, the option 502 may be accompanied by a map 508 that graphically indicates the path of the route from the origin (point "A" as shown) to the destination (point "B" as shown).

The text for option 504 indicates that the option 504 pertains to a route option for using self-driving for at least one portion of the route and using manual driving for at least one other portion of the route. The text for this option also indicates that the user will have to manually drive through an urban area instead of using the self-driving feature for the vehicle because of pedestrians in the urban area that can take the vehicle longer to drive through using self-driving. The text for option 504 may also indicate the estimated time the respective route will take to travel to reach the user's destination. Still further, the option 504 may be accompanied by a map 510 that graphically indicates the path of the route from the origin to the destination.

As also shown in FIG. 5, the text for option 506 indicates that the option 506 pertains to a route option for using only manual driving for the entire route. The text for this option also indicates that a particular highway reserved for only self-driving vehicle use cannot be taken because of the manual driving, and further indicates the estimated time the respective route will take to travel to reach the user's destination. The option 506 may be accompanied by a map 512 that graphically indicates the path of the route from the origin to the destination.

Figure 6:
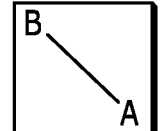
Figure 6:
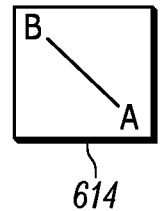

FIG. 6 shows yet another example UI 600 in accordance with present principles. The UI 600 may be presented on a display responsive to determining that manual driving will be used for navigating to a destination. The UI 600 thus includes an indication 602 that manual driving is to be used and/or that a user has selected manual driving. The UI 600 may also include information 604 indicating an estimated time that the route will take to travel to the destination and a reason for the estimated time. In this case, the reason that it has been estimated that the route will take ninety minutes to travel is because a lane of a particular highway that is reserved for autonomous driving cannot be used (where use of that lane might otherwise result in a shortened driving time to the destination). The information 604 may be accompanied by a map 606 that graphically indicates the path of the route.

The UI 600 may also include an indication 608 that an alternate route may be taken that uses autonomous driving/ autopilot. Selector 610 may be selected to provide input that the alternate route should be used, and accordingly responsive to selection of selector 610 the device may output directions for following the alternate route rather than the manual driving route. Information 612 may also be presented for the alternate route, with the information 612 indicating that autopilot will be used for driving on a particular highway but that manual driving will have to be used to traverse an urban area where autopilot driving is not optimal. The information 612 may also indicate an estimated time that the alternate route will take to travel to the destination. A map 614 may also be shown for the alternate route, with the map 614 graphically indicating the path of the alternate route.

Figure 7:
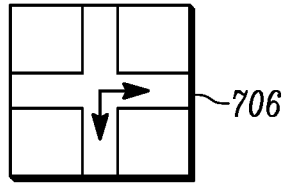

Continuing the detailed description in reference to FIG. 7, it shows yet another example UI 700 in accordance with present principles. The UI 700 may include an indication 702 that directions 704 for manual driving are currently being output via the UI 700. The UI 700 may also include a map 706 indicating the directions graphically. Additionally, the UI 700 may include a selector 708 that is selectable to provide a command to the vehicle to begin using autonomous driving/autopilot driving. Additionally or alternatively, the selector 708 may be selected to provide a command for the device determine and/or output an alternate route to take using autonomous driving rather than manual driving.

Figure 8:
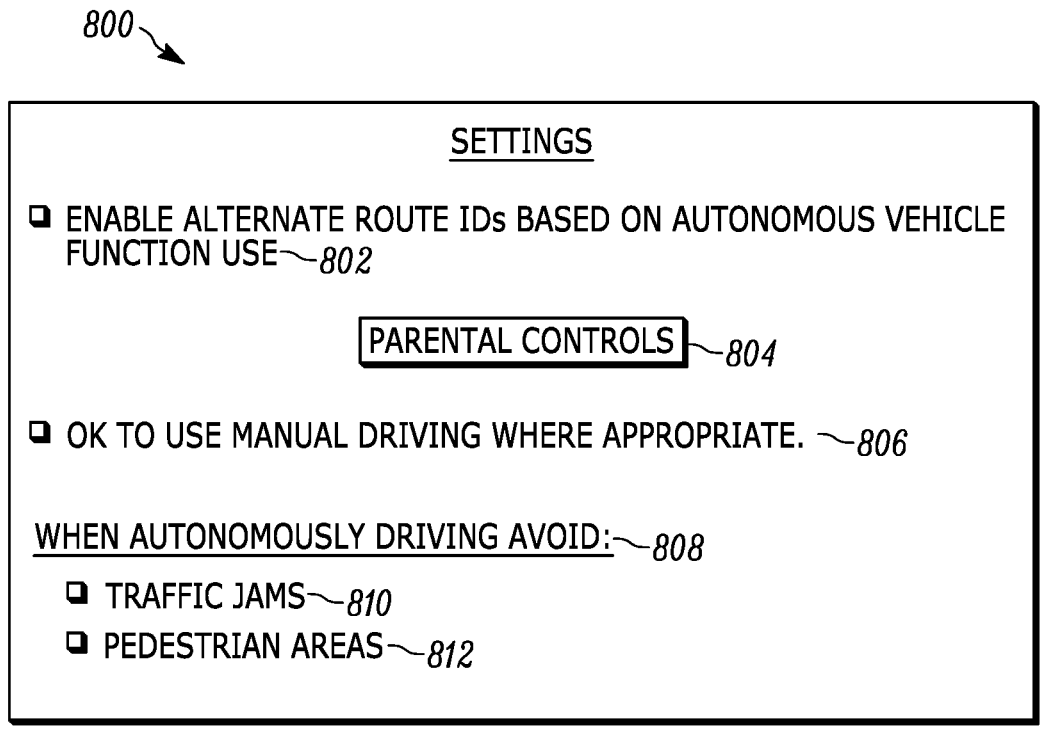

FIG. 8 shows a UI 800 that may be used for configuring settings of a device undertaking present principles, such as for configuring settings of a vehicle having an autonomous driving mode/autopilot feature as described herein. The UI 800 may also be for configuring settings of an application executable at an end-user's personal device (e.g., smart phone) for outputting directions on its display or for outputting the directions to the on-board computing system of the vehicle for the vehicle to autonomously follow the directions. Each of the options to be discussed below may be selected based on selection of the respective check box shown adjacent to the respective option.

As may be seen in FIG. 8, the UI 800 may include a first option 802 that is selectable to configure or enable the vehicle/device to identify routes for using the vehicle's autonomous vehicle function in accordance with present principles. For instance, selection of the option 802 may configure or enable the device to undertake the logic described above in reference to FIG. 3.

The UI 800 may also include a selector 804 that is selectable to initiate configuration of parental controls for autonomous driving. For example, selection of the selector 804 may cause the device to present the UI 900 of FIG. 9 for configuring parental controls. The UI 900 will be discussed further below.

The UI 800 may also include a second option 806 that is selectable to configure the device to specifically determine routes that may use a combination of manual driving and autonomous driving, rather than only autonomous driving, when determining autonomous driving routes. Thus, selection of the option 806 may enable or configure the device specifically to determine routes having respective portions to be driven manually and autonomously where, e.g., that may result in the shortest time to travel to the user's destination.

Still further, the UI 800 may include a setting 808 pertaining to types of things to avoid when determining routes/directions for autonomous driving. As examples, option 810 may be selected to enable or configure the device to avoid traffic jams when determining such directions, while option 812 may be selected to enable or configure the device to avoid areas associated with pedestrians when determining such directions.

Figure 9:
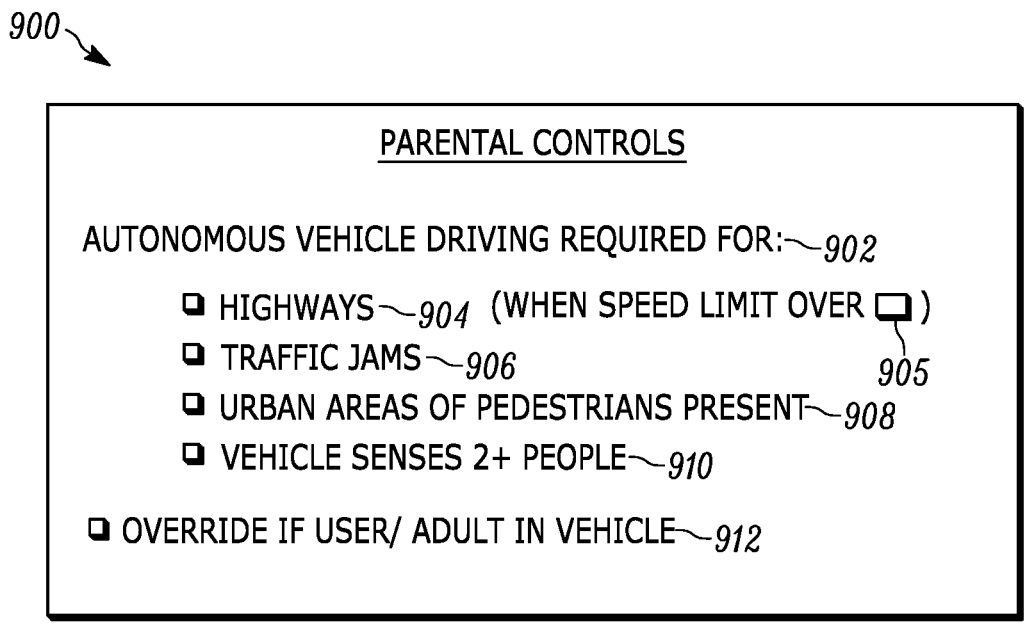

Now in reference to the parental control UI 900 of FIG. 9, it may be presented on a display so that a user may configure parental controls for a device or vehicle to be used by the user's child in accordance with present principles. For example, the UI 900 may include a setting 902 pertaining to situations and road types for which autonomous driving may be mandated for the child by the device or vehicle. For example, option 904 may be selected to mandate that autonomous driving be used for portions of routes that traverse highways and other roads over a predetermined speed limit (which may be set by the user by directing input to input box 905). Option 906 may be selected to mandate that autonomous driving be used for portions of routes currently experiencing adverse traffic conditions. Additionally, option 908 may be selected to mandate that autonomous driving be used for portions of routes that traverse urban areas if pedestrians are determined to be present in those urban areas (e.g., based on input from a camera imaging the vehicle's surroundings and object recognition to identify pedestrians). Option 910 may be selected to mandate that autonomous driving be used when the vehicle senses that two or more people are present in the vehicle, as may be determined based on input from respective weight sensors in the vehicle's seats and/or as may be determined based on input from a camera imaging the vehicle's interior and execution of object recognition to determine the number of people in the vehicle. Autonomous driving may be mandated in still other situations as well, such as using autonomous driving when the vehicle is in a particular area designated by the parent/user or when it is nighttime.

As also shown in FIG. 9, the UI 900 may include an option 912 to enable or configure the device to override the mandate(s) of autonomous driving that might have been selected via options 904-910 when the parent user and/or another adult is present in the vehicle with the child. The parent or other adult may be identified based on input from a camera imaging the vehicle's interior and execution of object/facial recognition to identify the user or another adult as being present.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and bearing instructions executable by the at least one processor to:
receive input indicating a destination;
determine whether at least a portion of travel to the destination will be driven using an autonomous vehicle function;
identify a first route to the destination based on a determination that at least a portion of travel to the destination will be driven using the autonomous vehicle function;
identify a second route to the destination based on a determination that at least a portion of travel to the destination will not be driven using the autonomous vehicle function, wherein the second route is different from the first route;
output directions for following one or more of the first route to the destination and the second route to the destination; and
present on a display, based on the determination that at least a portion of travel to the destination will be driven using the autonomous vehicle function, a user interface (UI) that indicates that manual driving should be performed for at least a portion of the first route based on pedestrian traffic along the portion of the first route.

2. The first device of claim 1, comprising the display, wherein the UI is a first UI, and wherein the instructions are executable by the at least one processor to:
present a second UI on the display, wherein the second UI indicates a first option that is selectable to indicate use of the autonomous vehicle function, and wherein the second UI indicates a second option that is selectable to indicate manual driving; and
wherein the determination of whether at least a portion of travel to the destination will be driven using the autonomous vehicle function is based on which of the first option and the second option is selected by a user.

3. The first device of claim 1, comprising a vehicle, wherein the first device is part of an on-board computer system of the vehicle, and wherein the determination of whether at least a portion of travel to the destination will be driven using the autonomous vehicle function is based on whether the vehicle has been placed in an autonomous driving mode associated with the autonomous vehicle function.

4. The first device of claim 1, wherein the first device is different from an on-board computer system of a vehicle, and wherein the instructions are executable by the at least one processor to:
wirelessly communicate with the on-board computer system;
based on the wireless communication, determine that the vehicle is in an autonomous driving mode associated with the autonomous vehicle function;
based on the determination that the vehicle is in the autonomous driving mode, determine that at least a portion of travel to the destination will be driven using the autonomous vehicle function;
determine directions to the location based on the determination that at least a portion of travel to the destination will be driven using the autonomous vehicle function; and
output the directions at least in part by communicating the directions to the on-board computer system for following the directions using the autonomous vehicle function.

5. The first device of claim 1, comprising the display, wherein the first device is different from an on-board computer system of a vehicle, and wherein the instructions are executable by the at least one processor to:
at least attempt to wirelessly communicate with the on-board computer system;
based on the at least attempt at wireless communication, determine whether the vehicle is in an autonomous driving mode associated with the autonomous vehicle function;
based on a determination that the vehicle is not in the autonomous driving mode, determine that at least a portion of travel to the destination will not be driven using the autonomous vehicle function;
determine directions to the location based on the determination that at least a portion of travel to the destination will not be driven using the autonomous vehicle function; and
output the directions on the display.

6. The first device of claim 1, wherein the first device is a server, and wherein the directions are output at least in part by providing the directions to a second device different from the first device.

7. The first device of claim 1, wherein the instructions are executable by the at least one processor to:
based on the determination that at least a portion of travel to the destination will be driven using the autonomous vehicle function, determine directions to the destination so that a street going through an area associated with pedestrians is avoided.

8. The first device of claim 1, wherein the instructions are executable by the at least one processor to:
based on the determination that at least a portion of travel to the destination will be driven using the autonomous vehicle function, determine directions to the destination so that an urban area is avoided.

9. The first device of claim 1, comprising a vehicle and at least one sensor on the vehicle, wherein the first device is part of an on-board computer system of the vehicle, and wherein the determination of whether at least a portion of travel to the destination will be driven using the autonomous vehicle function is based on whether more than one person is presently disposed within the vehicle as determined based on input from the at least one sensor.

10. The vehicle of claim 1, wherein the instructions are executable by the at least one processor to:
based on a determination that at least a portion of travel to the destination will not be driven using the autonomous vehicle function, determine directions to the destination that avoid a highway.

11. The vehicle of claim 1, wherein the instructions are executable by the at least one processor to:
based on a determination that at least a portion of travel to the destination will not be driven using the autonomous vehicle function, determine directions to the destination that avoid an adverse traffic condition.

12. A method, comprising:

determining whether an autopilot feature will be used for at least a portion of driving by a vehicle to a destination;

identifying a first route to the destination based on determining that the autopilot feature will be used for at least a portion of driving to the destination;

identifying a second route to the destination based on determining that the autopilot feature will not be used for at least a portion of driving to the destination, wherein the second route is different from the first route;

outputting directions for following one or more of the first route to the destination and the second route to the destination; and presenting on a display, based on determining that the autopilot feature will be used for at least a portion of driving to the destination, a user interface (UI) that indicates that manual driving should be performed for at least a portion of the first route based on pedestrian traffic along the portion of the first route.

13. The method of claim 12, comprising:

identifying the first route based on the autopilot feature being used for a portion of driving to the destination but not all of driving to the destination; and identifying a third route based on the autopilot feature being used for all driving to the destination, wherein the third route is different from the first and second routes.

14. The method of claim 12, comprising:

presenting on a display, based on determining that the autopilot feature will not be used for at least a portion of driving to the destination, a user interface (UI) that indicates the first route, the UI comprising an option that is selectable to select use of one or more of: the first route, the autopilot feature.

15. The method of claim 12, wherein at least the identifying steps are performed by a server, and wherein the directions are output at least in part by transmitting the directions to a device other than the server.

16. The method of claim 12, wherein the method is performed at least in part by a vehicle in communication with a server, wherein one or more of the first and second routes are identified based on receipt of route information from the server, and wherein the directions are output at the vehicle via a display.

17. The method of claim 12, comprising:

based on determining that the autopilot feature will be used for at least a portion of driving to the destination, determining directions to the destination so that one or more of: a lane reserved for autopilot driving but not manual driving by a person is used, a road reserved for autopilot driving but not manual driving by a person is used, a highway reserved for autopilot driving but not manual driving by a person is used.

18. A computer readable storage medium (CRSM) that is not a transitory signal, the computer readable storage medium comprising instructions executable by at least one processor to:

determine whether an autopilot feature will be used for at least a portion of driving by a vehicle to a destination;

identify a first route to the destination based on determining that the autopilot feature will be used for at least a portion of driving to the destination;

identify a second route to the destination based on determining that the autopilot feature will not be used for at least a portion of driving to the destination, wherein the second route is different from the first route;

output directions for following one or more of the first route to the destination and the second route to the destination; and present on a display, based on determining that the autopilot feature will be used for at least a portion of driving to the destination, a user interface (UI) that indicates that manual driving should be performed for at least a portion of the first route based on pedestrian traffic along the portion of the first route.

19. The CRSM of claim 18, wherein the instructions are executable by the at least one processor to:

identify the first route based on the autopilot feature being used for a portion of driving to the destination but not all of driving to the destination; and identify a third route based on the autopilot feature being used for all driving to the destination, wherein the third route is different from the first and second routes.

20. The CRSM of claim 18, wherein the determination of whether the autopilot feature will be used for at least a portion of driving by the vehicle to the destination is based on whether more than one person is presently disposed within the vehicle as determined based on input from at least one sensor.

\* \* \* \* \*